(12) United States Patent
Evans et al.

(10) Patent No.: US 8,005,572 B2
(45) Date of Patent: Aug. 23, 2011

(54) FLEXIBLE CONNECTION OF TEACHING DEVICES TO PROGRAMMABLE CONTROLLERS

(75) Inventors: Judy A. Evans, Oakland, MI (US); Kenneth W. Krause, Rochester Hills, MI (US); Glenn F Nowak, Trenton, MI (US)

(73) Assignee: Fanuc Robotics America, Inc., Rochester Hills, MI (US)

( * ) Notice: Subject to any disclaimer, the term of this patent is extended or adjusted under 35 U.S.C. 154(b) by 1022 days.

(21) Appl. No.: 11/817,730

(22) PCT Filed: Mar. 3, 2006

(86) PCT No.: PCT/US2006/008039
§ 371 (c)(1),
(2), (4) Date: Sep. 4, 2007

(87) PCT Pub. No.: WO2006/096695
PCT Pub. Date: Sep. 14, 2006

(65) Prior Publication Data
US 2009/0299524 A1 Dec. 3, 2009

Related U.S. Application Data

(60) Provisional application No. 60/658,476, filed on Mar. 4, 2005.

(51) Int. Cl.
*G05B 19/418* (2006.01)
(52) U.S. Cl. ........ 700/248; 700/200; 700/247; 700/250; 700/251; 700/254; 318/568.14; 318/568.18; 318/568.2; 318/568.21; 318/568.22; 901/1; 901/4; 901/6; 901/19; 901/46; 701/21
(58) Field of Classification Search .................... 700/83, 700/86, 181, 200, 247, 250, 251, 254, 255, 700/256, 258; 318/568.14, 568.18, 568.2, 568.21, 568.22, 573, 574; 901/1, 4, 6, 19, 46, 49, 50; 701/21
See application file for complete search history.

(56) References Cited

U.S. PATENT DOCUMENTS

| | | | | | |
|---|---|---|---|---|---|
| 4,120,583 | A | * | 10/1978 | Hyatt | 355/86 |
| 4,988,934 | A | * | 1/1991 | Toyoda et al. | 318/568.15 |
| 5,025,393 | A | * | 6/1991 | Naito | 700/264 |
| 5,204,942 | A | * | 4/1993 | Otera et al. | 700/248 |
| 5,705,906 | A | * | 1/1998 | Tanabe et al. | 318/568.13 |
| 5,737,218 | A | * | 4/1998 | Demotte et al. | 700/86 |
| 5,751,918 | A | * | 5/1998 | Shimogama et al. | 700/264 |
| 5,760,560 | A | * | 6/1998 | Ohya et al. | 318/568.1 |

(Continued)

OTHER PUBLICATIONS

FANUC, iPendant Jun. 2005, Internet, pp. 1-2.*

(Continued)

*Primary Examiner* — James P Trammell
*Assistant Examiner* — McDieunel Marc
(74) *Attorney, Agent, or Firm* — Fraser Clemens Martin & Miller LLC; William J. Clemens

(57) ABSTRACT

An apparatus provides selective communication between multiple programmable robot controllers and one or more teaching devices connected by a network. The network controls communication between the teaching devices and the controllers including active tasks and passive tasks for preventing communication of active tasks between any of the controllers and more than one of any of the teaching devices. The network permits communication of the passive tasks between any of the controllers and one of the teaching devices communicating active tasks with another one of the controllers.

17 Claims, 3 Drawing Sheets

U.S. PATENT DOCUMENTS

| | | | |
|---|---|---|---|
| 6,356,806 B1 * | 3/2002 | Grob et al. | 700/245 |
| 6,444,942 B1 * | 9/2002 | Kawai et al. | 219/110 |
| 6,518,980 B1 | 2/2003 | DeMotte et al. | |
| 6,560,513 B2 | 5/2003 | Krause et al. | |
| 6,828,522 B2 * | 12/2004 | Hochhalter et al. | 219/86.32 |
| 6,853,881 B2 * | 2/2005 | Watanabe et al. | 700/264 |
| 6,954,680 B2 | 10/2005 | Kreidler et al. | |
| 7,136,723 B2 * | 11/2006 | Hirayama et al. | 700/245 |
| 7,373,220 B2 * | 5/2008 | Watanabe et al. | 700/264 |
| 7,577,497 B2 * | 8/2009 | Johannessen et al. | 700/245 |
| 2002/0147528 A1 * | 10/2002 | Watanabe et al. | 700/245 |
| 2004/0093120 A1 * | 5/2004 | Ebisawa et al. | 700/245 |
| 2004/0260426 A1 * | 12/2004 | Johannessen et al. | 700/245 |
| 2004/0260563 A1 * | 12/2004 | Hashimoto et al. | 704/275 |
| 2005/0010311 A1 * | 1/2005 | Barbazette et al. | 700/78 |
| 2006/0145877 A1 * | 7/2006 | Ehlers | 340/573.7 |
| 2010/0092032 A1 * | 4/2010 | Boca | 382/103 |
| 2010/0305758 A1 * | 12/2010 | Nishi et al. | 700/264 |

OTHER PUBLICATIONS

Afzulpurkar et al., Adaptive Linear Robot Control for Tracking and Grasping a Dyanamic Object, 2002, IEEE,. p. 578-583.*
Vollmann, Realistic Robot Simulation: Multiple Instantianting of Robot Controller Software, 2002, IEEE, pp. 1194-1198.*
KUKA, KUKA PC-based ocntroller and software, 2001.*

* cited by examiner

FLEXIBLE CONNECTION OF TEACHING DEVICES TO PROGRAMMABLE CONTROLLERS

CROSS-REFERENCE TO RELATED APPLICATION

This application claims the benefit of U.S. provisional patent application Ser. No. 60/658,476 filed Mar. 4, 2005.

BACKGROUND OF THE INVENTION

The present invention relates to a flexible connection of teaching devices to programmable controllers. A network is used for selectively connecting one teaching device to two or more controllers, or selecting one of at least two teaching devices for connection to selected ones of a plurality of controllers.

Generally, one teaching pendant is hard wired to one programmable controller. If it is desired to communicate with a second programmable controller, then the teaching pendant is manually disconnected from the first programmable controller, or robot, for manual connection to the second controller, or robot.

The prior art requires a teach pendant to be connected to a robot controller at all times and is generally dedicated to the control of that one programmable robot controller. In some cases multiple robots are connected to the same controller in which case one pendant can control multiple robots. However, this is limited to the number of robots that a single controller can accept. It is also limited in that it is difficult or impossible for the robot manufacturer to configure inventory to meet the needs of any combination or permutation of robot arms and controllers.

Another shortcoming of the prior art is that there is only ever one teach pendant that can be used.

The present invention is aimed at one or more of the problems identified above.

SUMMARY OF THE INVENTION

In one aspect of the invention, a robot system is provided with a single teach pendant for communicating with multiple programmable controllers or multiple robots controlled by a single programmable controller. This is especially advantageous in a situation where one controller controls multiple robots, such as a dual arm system, allowing the teaching pendant to select either robot. However, in this case there is only one controller involved.

In another aspect of the invention, a system is provided for multiple teaching devices to communicate with multiple programmable controllers. When a teaching device is communicating with a programmable controller, the teaching device can also communicate with other programmable controls to perform non-motion functions. Therefore, a teaching device can log into the robot controller from a PC and do operations that don't specifically relate to jogging or teaching points. This is unique in that the pendant can do all operations just like a dedicated pendant once it is logged in, providing a single interface for multiple controllers.

The shortcomings of the prior art systems are avoided by allowing the pendant to make connection via a network (Ethernet, wireless, any such connection) to any robot controller that is designated to be part of the overall system. This allows a system to be configured with multiple robot controllers and one or multiple pendants. In such a system any pendant can connect to and operate any controller. With this approach as many teach pendants as are required at a given time to do teaching operations can be provided.

DESCRIPTION OF THE DRAWINGS

The above, as well as other, advantages of the present invention will become readily apparent to those skilled in the art from the following detailed description of a preferred embodiment when considered in the light of the accompanying drawings in which.

DESCRIPTION OF THE PREFERRED EMBODIMENT

U.S. provisional patent application Ser. No. 60/658,476 filed Mar. 4, 2005 is hereby incorporated herein by reference.

Figure 1:
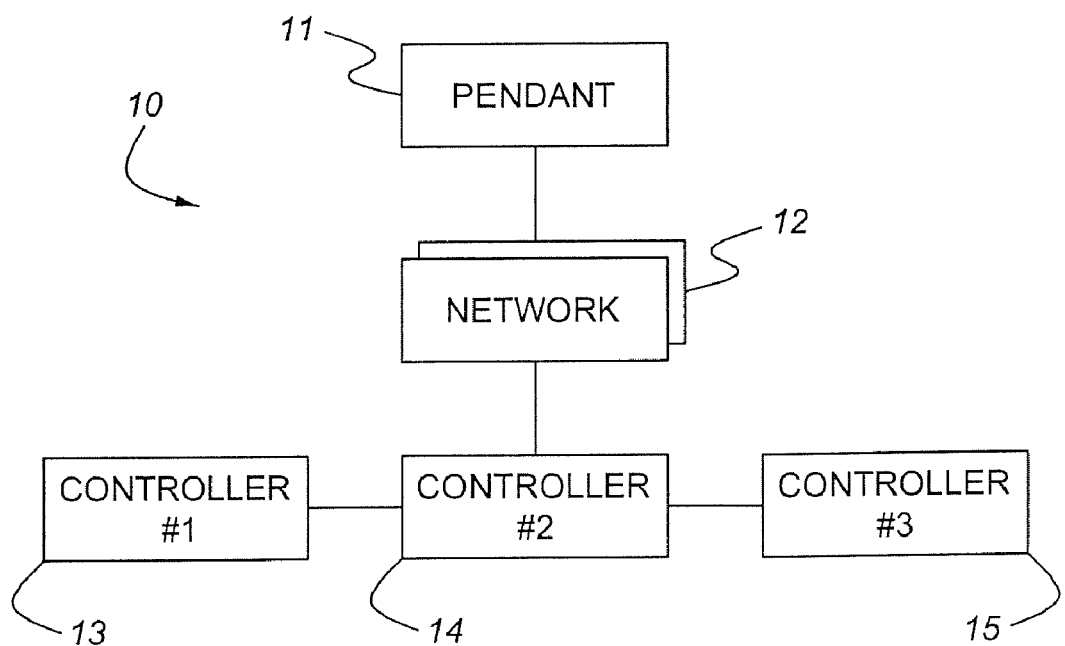
FIG. 1 is a schematic block diagram of a system in accordance with the present invention utilizing one teach pendant.

FIG. 1 shows a system 10 according to the present invention having a single teaching device such as a teach pendant 11 connected to a network 12 (Ethernet, wireless, any such connection). A plurality of programmable controllers are also connected to the network 12 such as a controller #1 13, a controller #2 14 and a controller #3 15. Three controllers are shown by way of example, however, as little as two, or more than three controllers can be utilized. The system 10 permits the teach pendant 11 to be selectively connected to one or more of the controllers 13, 14 and 15 through the network 12.

The single teach pendant 11 is coupled to one of the robot controllers, for example the controller 13, preferably by logging in to the controller 13 via the network 12 for actively performing a variety of tasks such as jogging, running and displaying programs. While logged in to the controller 13, the pendant 11 may remotely log in to a second controller, e.g. the controller 14, for passive tasks such as monitoring operations. The pendant 11 displays both operating menus for each of the controllers 13, 14 while in dual communication.

Additionally, the single teach pendant 11 may remotely log in to a third controller, the controller 15, for passive tasks while displaying the operating menu for each of the controllers 13, 14, and 15. The single teach pendant 11 may remotely log in to any number of controllers for performing passive tasks and display the corresponding operating menu for each controller connected. The teach pendant 11 can be of the type described in U.S. Pat. No. 6,560,513, entitled Robotic System with Teach Pendant" issued May 6, 2003, incorporated herein by reference.

Figure 2:
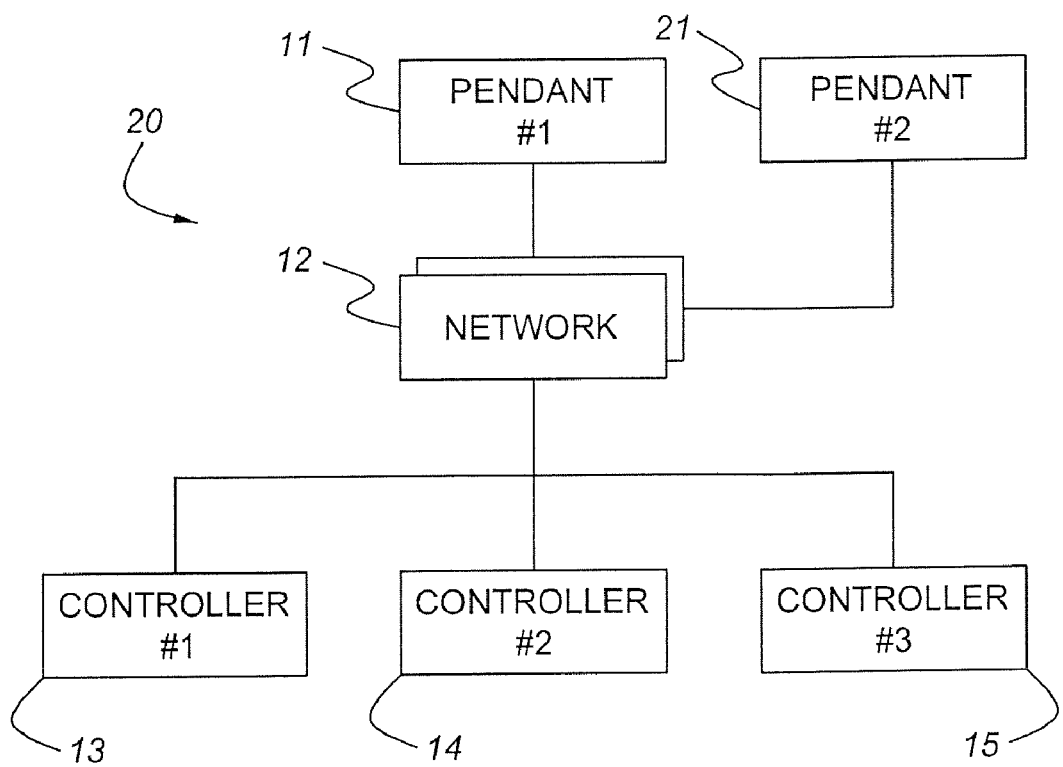
FIG. 2 is a schematic block diagram of a system in accordance with the present invention utilizing two teach pendants.

FIG. 2 shows a system 20 according to the present invention that incorporates all of the components of the system 10 and adds a second teaching device such as a teach pendant 21 connected to the network 12. The system 20 permits the pendant 21 to be selectively connected to one or more of the controllers 13, 14 and 15 through the network 12 while protecting against simultaneous connection of the pendants 11 and 21 to each of the controllers 13, 14 and 15 through the network 12. The system according to the present invention can selectively connect each of a plurality of teach pendants to each of a plurality of programmable controllers.

In this embodiment, each of the multiple teach pendants 11, 21 is logged in to the individual controllers 13, 14 respectively and may remotely log in to the other controller and/or the additional controller 15 for performing passive tasks. Each teach pendant 11, 21 may remotely log in to any number of controllers for performing passive tasks and display the corresponding operating menu for each controller connected.

The remotely logged in teach pendant 11, 21 is capable of, but not limited to, inputting the following directives:
- request web pages from the remote robot,
- start/stop monitors on the remote robot,
- input keys and commands to the remote robot,
- input watchdog characters and sequence numbers to the remote robot,
- start a RPC connection to the remote robot and get/set data, and
- keep the RPC connection to the master robot.

And is capable of, but not limited to, directing the remote robot to output and display of following directives:
- The remote robot will send web pages to the pendant, and
- The remote robot will send PMON packets to the pendant.

Figure 3:
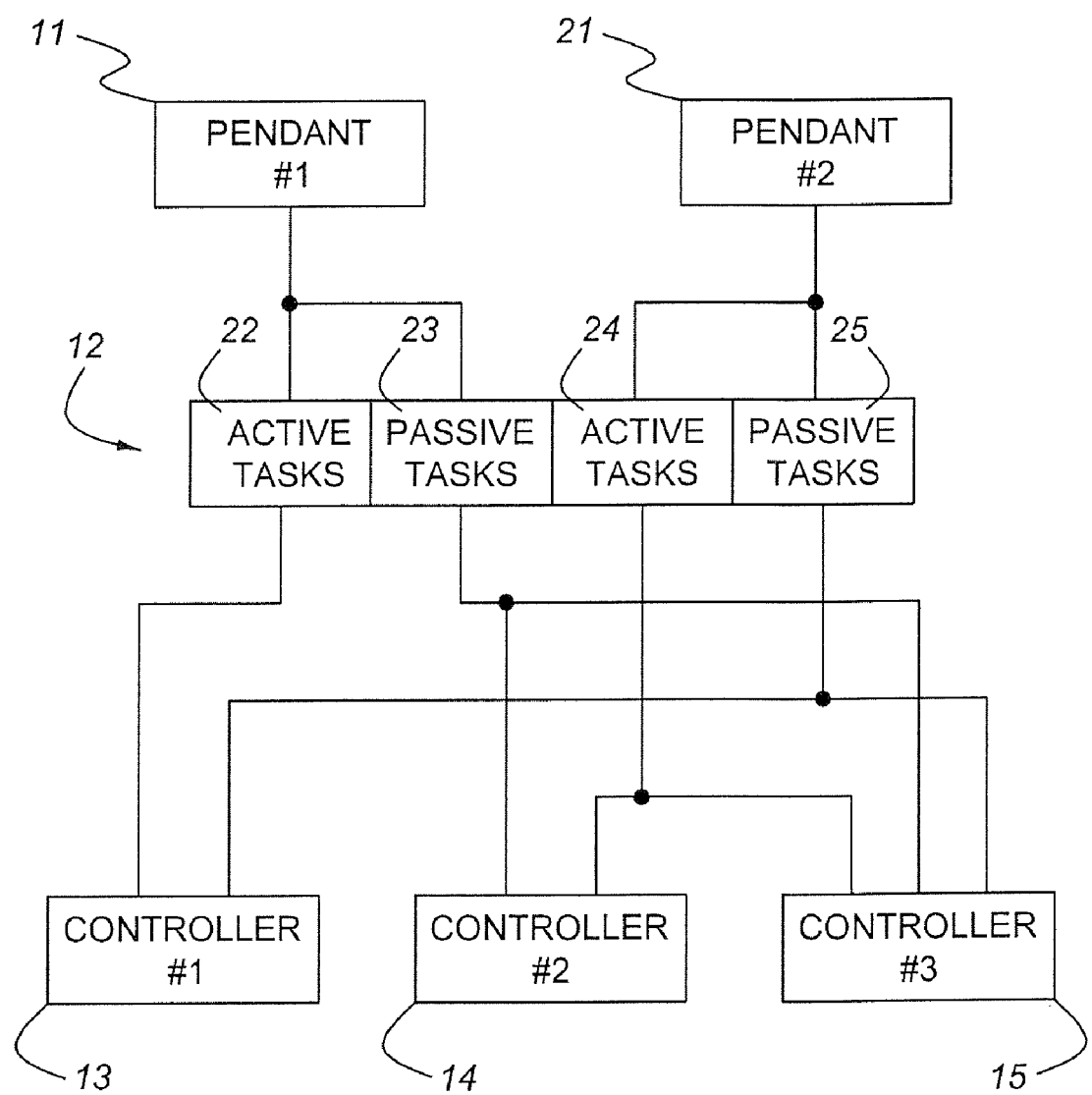
FIG. 3 is the block diagram of FIG. 2 showing one combination of connections between the teach pendants and the controllers according to the present invention.

With reference to FIG. 3, the network 12 can include a server that runs a program that prevents the simultaneous connection of the teach pendant 11 and the teach pendant 21 to the same controller for performing active tasks. The network 12 has an active tasks portion 22 and a passive tasks portion 23 for the teach pendant 11 and has an active tasks portion 24 and a passive tasks portion 25 for the teach pendant 21. For example, assume that the teach pendant 11 is connected to the controller 13 for active tasks through the active tasks portion 22 as shown in FIG. 3. Then the active tasks portion 24 will prevent connection of the teach pendant 21 to the controller 13 for active tasks, but does permit connection of the teach pendant 21 to the controllers 14 and 15 for active tasks as shown in FIG. 3. In a similar manner, the teach pendant 11 is connected to the controller 13 through the passive tasks portion 23 and the teach pendant 21 is connected to the controllers 14 and 15 for passive tasks through the passive tasks portion 25. However, it may be important that the user of either of the teach pendants to know how a controller connected to the other teach pendant is operating. Thus, the server in the network 12 can permit connection of the teach pendant 11 to the controllers 14 and 15 through the passive tasks portion 23 and connection of the teach pendant 21 to the controller 13 through the passive tasks portion 25.

Not shown are the typical emergency stop switch and deadman switch which are needed to secure the safety of an operator. In a preferred embodiment, the emergency stops of the multiple teaching devices are interlocked through hardware circuits to stop all robots when one emergency stop is activated.

Figure 4:
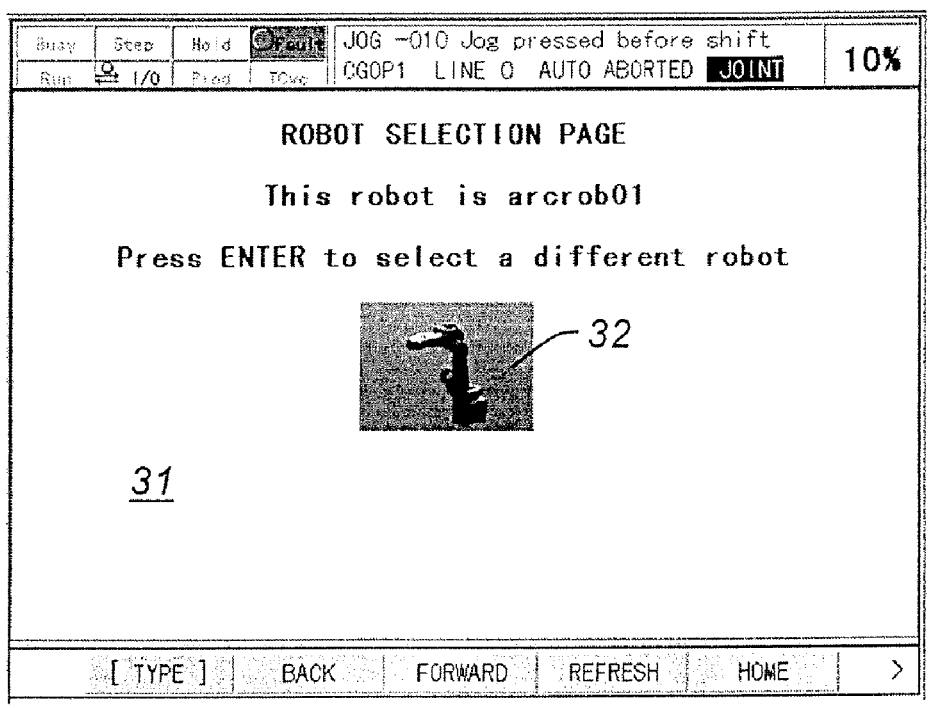
FIG. 4 is an example of a user display for selecting a programmable controller on a teach pendant of the present invention.
Figure 5:
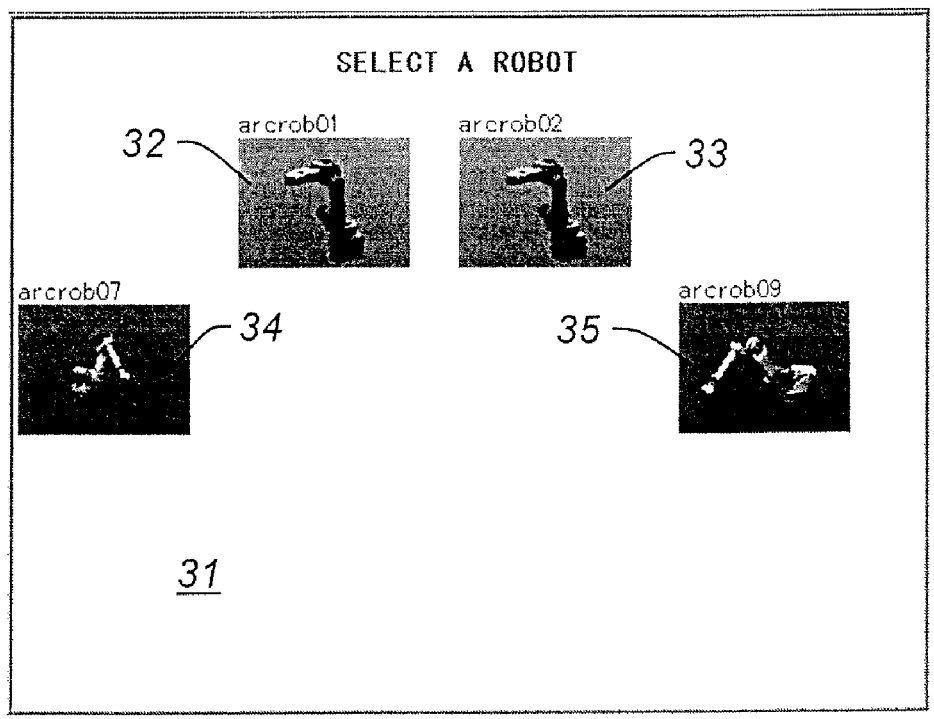
FIG. 5 is an example of a user display illustrating multiple controllers available for remote log in on a teach pendant of the present invention.

The teach pendant 11, 21 also includes a teach pendant control module (not shown) which provides communication with each of the controllers 13, 14 and 15 including visual and audio feedback to the operator and means for and inputting receiving data. FIGS. 4 and 5 illustrate displays that are generated at the teach pendant allowing the operator to choose between a series of multiple individual log in's (FIG. 4) and a multiple display, such as a list and corresponding picture, for the log in's (FIG. 5). To aid the operator during communication, each programmable controller may be assigned unique names and/or colors on the pendant display indicating whether or not a connection is made and what type of connection, direct or remote. This display may be a user designed web page or direct link. If a direct log in connection between the robot and the teaching device is lost, the robot will stop and the display on the teaching device will indicate the disconnection. Alternatively, if the programmable controller of the designated robot is shut down or removed, the teaching device will connect to a default programmable controller and display this connection. For example, if the controller 14 is a default controller and the controller 13 is shut down, the network 12 will substitute the controller 14 for communication of active tasks with the teach pendant 11.

As shown in FIG. 4, the teach pendant 11, 21 has a display 30 including a central screen 31 for generating a visual display of an icon 32 identifying the robot to which the teach pendant is connected. An instruction above the icon 32 directs the user to press ENTER to change the display to a different robot to be selected. As shown in FIG. 5, the central screen 31 has multiple icons 32 through 35 each representing a different robot to be selected.

As with the emergency stops, the networking of the multiple programmer controllers with the multiple teaching devices allows the robot system to notify all connected devices, including remote PC's, input devices, and processors, certain operating directives. These operating directives can include: 1) that only a teaching device can activate programs and only at a safe speed; 2) that only a teaching device can activate programs and may be doing so at full program speed; or 3) that all teaching devices are disabled and devices other than a teaching device can activate programs. Each teaching pendant displays such notifications.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A multiple robot system comprising:
   at least two teaching devices;
   at least two programmable controllers each connected to an associated robot; and
   a network connected between said at least two programmable controllers and said at least two teaching devices for facilitating flexible communication between each of them, wherein each of said at least two teaching devices can display information related to and operate each of said at least two programmable controllers and wherein said network prevents operation of one of said at least two programmable controllers by one of said at least two teaching devices when another one of said at least two teaching devices is in communication with said one of said at least two programmable controllers for performing active tasks.

2. The multiple robot system according to claim 1 wherein said network permits one of said at least two teaching devices to perform passive tasks with one of said at least two controllers in communication with another one of said teaching devices for performing active tasks.

3. The multiple robot system according to claim 1 wherein said network permits communication between one of said at least two controllers and only one of said at least two teaching devices at a time for jogging and running programs.

4. The multiple robot system according to claim 1 wherein each of said at least two teaching devices includes a display for visually indicating information related to each of said at least two controllers.

5. The multiple robot system according to claim 4 wherein each of said at least two controllers is represented by a different icon on said display.

6. The multiple robot system according to claim 1 wherein each of said at least two controllers is selected from an associated link on said displays.

7. The multiple robot system according to claim 1 wherein said network will stop the robots connected to said at least two controllers if there is a loss of connection between one of said at least two teaching devices and one of said at least two controllers while jogging and running programs.

8. The multiple robot system according to claim 1 including a default controller connected to said network whereby when one of said at least two controllers is shut down or removed during active task communication with one of said at least two teaching devices, said network connects said default controller to said one of said at least two teaching devices.

9. The multiple robot system according claim 1 wherein when one of said at least two teaching devices is communicating with one of said at least two controllers for active tasks, said network permits said one of said at least two teaching devices to communicate with another one of said at least two controllers for passive tasks.

10. A method for controlling multiple robot controllers comprising the steps of:
 a) providing a communications network;
 b) connecting at least two robot controllers to the network;
 c) connecting at least two teaching devices to the network; and
 d) selectively communicating between each of the teaching devices and the at least two robot controllers for performing active tasks and passive tasks, wherein the network prevents operation of one of the at least two robot controllers by one of the at least two teaching devices when another one of the at least two teaching devices is in communication with the one of the at least two robot controllers for performing active tasks.

11. The method according to claim 10 including a step of displaying at one of the teaching devices an, operating menu of each of the at least two controllers communicating with the one teaching device.

12. The method according to claim 10 wherein the network prevents another teaching device connected to the network from communicating active tasks to one of the controllers performing the active tasks in communication with one of the teaching devices.

13. The method according to claim 10 including displaying at one of the teaching devices an indication of each of the at least two controllers communicating with the one teaching device.

14. The method according to claim 10 wherein a robot connected to one of the at least two controllers is stopped if a loss of connection occurs between one of the teaching devices and the one of the at least two controllers during communication of active tasks.

15. The method according to claim 10 wherein the network causes one of the teaching devices to connect to a default controller if a one of the at least two controllers is shutdown or removed from the network during communication with the one teaching device.

16. The method according to claim 10 wherein the network permits the teaching devices to communicate active tasks with one of the at least two controllers while communicating passive tasks with another one of the at least two controllers.

17. A system for communication between multiple programmable robot controllers and multiple teaching devices:
 at least two programmable robot controllers;
 at least two teaching devices; and
 a network for selective communication between said at least two teaching devices and said at least two controllers, said network including active task portions and passive task portions for preventing communication of active tasks between any of said at least two controllers and more than one of any of said teaching devices, wherein said network prevents operation of one of said at least two robot controllers by one of said at least two teaching devices when another one of said at least two teaching devices is in communication with said one of said at least two robot controllers for performing active tasks.

* * * * *